United States Patent [19]

Lagow et al.

[11] Patent Number: 4,900,793

[45] Date of Patent: Feb. 13, 1990

[54] FLUORINATED ELASTOMERIC MATERIALS

[76] Inventors: Richard J. Lagow, 6204 Shadow Mountain, Austin, Tex. 78731; Earl T. Dumitru, 10116 Aspen St., Austin, Tex. 78758

[21] Appl. No.: 358,458

[22] Filed: May 25, 1989

Related U.S. Application Data

[60] Continuation of Ser. No. 908,198, Sep. 17, 1986, abandoned, which is a division of Ser. No. 722,984, Apr. 15, 1985, Pat. No. 4,621,107, which is a continuation of Ser. No. 407,700, Aug. 12, 1982, abandoned.

[51] Int. Cl.$^4$ ................................................. C08F 8/22
[52] U.S. Cl. ........................... 525/326.3; 522/185; 525/326.4; 525/356
[58] Field of Search ............ 525/326.3, 376.4; 522/185

[56] References Cited

U.S. PATENT DOCUMENTS

| | | | |
|---|---|---|---|
| 2,497,046 | 2/1950 | Kropa | 525/326.4 |
| 2,700,661 | 1/1955 | Miller | 525/326.4 |
| 2,968,649 | 1/1961 | Pailthorp et al. | 526/254 |
| 3,051,677 | 8/1962 | Rexford | 526/254 |
| 3,639,510 | 2/1972 | Paine | 525/326.4 |
| 3,655,727 | 4/1972 | Patel et al. | 525/326.3 |
| 4,675,380 | 6/1987 | Buckmaster et al. | 525/326.4 |

FOREIGN PATENT DOCUMENTS 84608862  11/1985  Japan .

*Primary Examiner*—Joseph L. Schofer
*Assistant Examiner*—Bernard Lipman
*Attorney, Agent, or Firm*—Hamilton, Brook, Smith & Reynolds

[57] ABSTRACT

This invention relates to a method of making perfluorinated elastomeric materials, and to materials made by such methods. In the full synthetic scheme, a partially fluorinated polymeric compound, with moieties to prevent crystallization, is created. It is then crosslinked to a desired degree, then perfluorinated.

Various intermediate materials, such as partially fluorinated crosslinked polymers, have useful properties, and are or may become commercially available. One embodiment of this invention therefore relates to perfluorination of a selected partially fluorinated, crosslinked material, which is one step of the full synthetic scheme.

10 Claims, No Drawings

FLUORINATED ELASTOMERIC MATERIALS

GOVERNMENT SUPPORT

The invention described herein was supported in whole or in part by funding from the United States Department of Energy.

This is a continuation of co-pending application Ser. No. 06/908,198 filed on Sept. 17, 1986 now abandoned, which is a division of application Ser. No. 722,984, filed 4-15-85, now U.S. Pat. No. 4,621,107, which was a FWC application of Ser. No. 407,700, filed 8-12-82, now abandoned.

TECHNICAL FIELD

This invention is in the field of chemistry, elastomeric materials, and corrosion resistance.

BACKGROUND ART

In general, an "elastomeric material" or "elastomer" includes any material which can be stretched, bent, compressed, or otherwise distorted when subjected to force, and which is capable of returning to substantially the undistorted shape within a reasonably short time after the force is removed. An elastomer must be capable of a substantial degree of stretching under tension before breaking. Elastomers are useful in a wide variety of applications, including fluid-impervious seals between mechanical parts, seals between moving parts, electrical insulation, and various forms of non-rigid coupling of mechanical parts such as shock absorption and vibration damping.

Elastomers may be subjected to a wide variety of adverse or hostile conditions or environments. For example, elastomers may be exposed to high temperatures, high pressures, corrosive or abrasive substances, and solvents. To withstand such conditions, it is highly desirable to have elastomeric materials which can withstand hostile environments for substantial periods of time. Such materials may be useful in geothermal operations, oil and gas drilling and production operations, chemical processing and handling operations, power generation and handling, and a wide variety of other uses.

In the search for non-metallic, non-ceramic materials that can withstand hostile environments, substantial attention has focused upon fluorocarbon polymers. As used herein, the term "fluorocarbon" comprises molecules that contain both fluorine and carbon, regardless of whether such molecules also contain other atoms such as hydrogen, oxygen, or chlorine. Carbon-carbon bonds and carbon-fluorine bonds are relatively strong and stable, and a variety of polymerization reactions [1] and fluorination reactions [2] are well known in the art.

Polymerization reactions may be performed in a variety of sequences, utilizing a variety of starting materials which are usually called "monomers." Unsaturated monomers such as ethylene or propylene are commonly used because they contain double bonds between adjacent carbon atoms which provide useful, easily controlled reaction sites. For example, ethylene and propylene may be reacted to provide a polymer as follows:

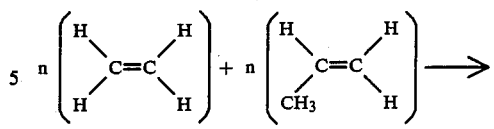

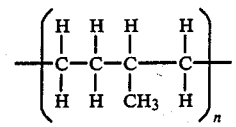

where "n" is a large number. Using the conventional terminology, this polymer may be named after its starting materials e.g., "ethylene-propylene" or "copolyethylene-propylene," even though there are few, if any, unsaturated bonds left in the material after it is polymerized. The prefix "co-" in "copoly-" indicates that two or more monomers are used as starting materials. Different monomers may be incorporated into a copolymer in random sequence, alternating sequence, block sequences (e.g., long stretches of "A" monomer alternating randomly with long stretches of "B" monomer), or graft form (e.g., side chains of "A" monomer on a backbone of "B" monomer).

It is possible to control the quantity or molar ratio of monomers that are present during a polymerization reaction. For example, if 4 moles of ethylene and 1 mole of propylene are mixed and polymerized, the resulting chain may be represented as either of the following:

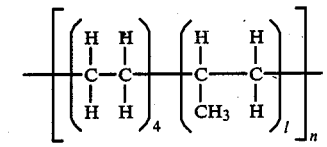

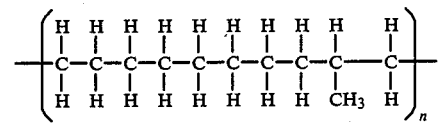

This molecule is, in effect, a long saturated chain of carbon atoms called a "backbone," with one methyl group ($-CH_3$) attached as a "moiety" on approximately every tenth carbon atom on the average. Other feedstocks may be used to create other types of moieties attached to backbone chains.

In general, a moiety is a molecular group that is attached to a backbone chain in a branch or pendant configuration. For example, a methyl, ethyl, vinyl, propyl, butyl, aryl, methoxy, or other organic group that is covalently bonded to a long carbon chain is a moiety. By contrast, a single atom such as hydrogen, chlorine, fluorine or oxygen which is attached to a backbone chain is not regarded herein as a moiety. In addition, if two polymeric backbone chains are crosslinked to each other, then neither is regarded as a moiety of the other molecule.

Moieties play a very important role in the physical characteristic of polymers, by preventing backbone chains from fitting closely against other backbone chains. Polymers that do not have moieties tend to be regularly shaped, symmetric molecules that can fit closely against similar molecules. Such molecules tend to solidify or "crystallize." In comparison, polymers that have numerous moieties tend to be less able to crystallize, and therefore tend to remain in a fluid state.

A variety of techniques are known which are capable of "crosslinking" polymeric molecules, i.e., creating bonds between backbone carbon chains. Such bonds may be between carbon atoms of backbone chains, or they may be through oxygen, nitrogen or sulfur atoms, a variety of moieties, or other non-backbone atoms. Techniques for crosslinking polymers include electron radiation, gamma radiation, ultraviolet radiation, the use of substances such as peroxides which create free radicals, and the use of chemically reactive substances such as diamines [3]. In the manufacture of elastomers with high performance characteristics, crosslinking bonds are usually covalent. However, it is possible to create crosslinked materials that are suitable for some purposes which contain non-covalent crosslinking bonds.

Fluorine can be incorporated into a fluorocarbon polymer in a variety of ways, including the following:

1. fluorine may be present in one or more of the monomers that are polymerized. For example, three illustrative reactions are:

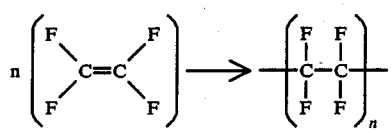

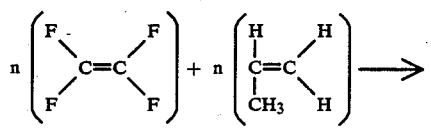

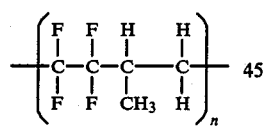

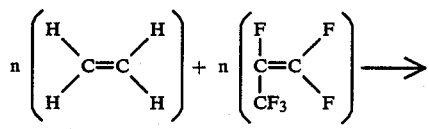

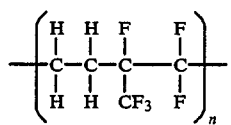

2. fluorine may be added or substituted for hydrogen by "direct" fluorination of a hydrocarbon polymer or a partially fluorinated polymer [4]. The phrase "direct fluorination" implies that elemental fluorine, as fluorine gas ($F_2$), is contacted with the material being fluorinated. For example, two such reactions (in non-stoichiometric form) are:

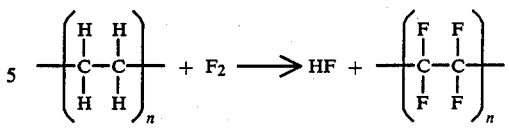

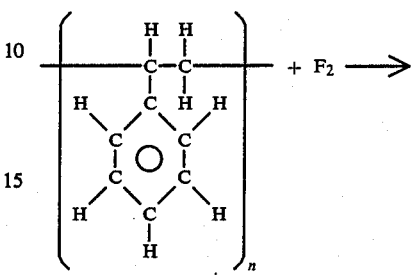

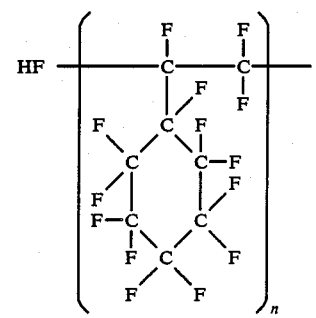

$F_2$ reacts very rapidly and exothermically when contacted with hydrocarbons. In order to slow down the reaction and prevent explosions, combustions, or undesired byproducts, direct fluorination may be commenced at low temperature or low pressure, and in the presence of an inert gas such as helium.

3. fluorine may be added indirectly to a polymer. The word "indirectly" implies that the fluorine is supplied in the form of a compound, such as molybdenum hexafluoride ($MoF_6$) or cobalt trifluoride ($CoF_3$), which releases fluorine when heated or otherwise manipulated.

Commercially Available Fluorocarbon Polymers

A variety of fluorocarbon polymers are commercially available. The following is a list of several such materials, with a brief description of their composition and characteristics.

PTFE

Polytetrafluoroethylene (PTFE) is formed by polymerizing tetrafluoroethylene, as shown in the following example reaction:

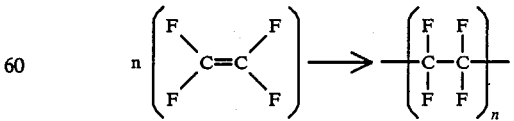

PTFE is commercially available under the trademark, "Teflon" (Dupont Corp., Wilmington, Del.). It is relatively stable in the presence of high temperatures and is used, for example, to provide non-stick surfaces on cooking utensils. However, it is an uncrosslinked, crystalline material that is unsuitable for uses that require elastomeric properties.

VDFHFP

VDFHFP is made by polymerizing a mixture of vinylidene fluoride (VDF) with hexafluoropropylene (HFP), as shown in the following example reaction, where X and Y are small numbers and n is a large integer:

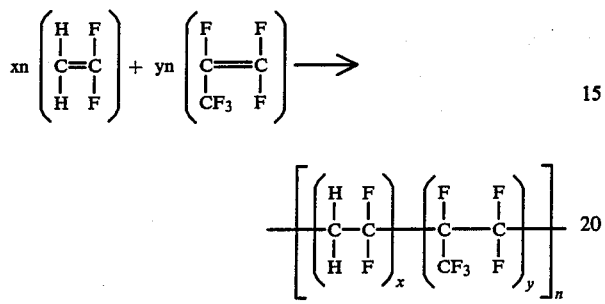

A family of materials with this general formula is commercially available under the trademark "Viton" (Dupont Corp.). Various types of plasticizers, fillers, and other processing compounds and techniques are used during the manufacture of "Viton" to provide a range of possible characteristics which are useful for certain purposes, such as high viscosity or low viscosity. Such materials are distinguished commercially by grade designations such as "Viton C-10" and "Viton A-35". These materials have characteristics which are described in literature that is published and distributed by the Dupont Corp.

The mole ratio of VDF to HFP may be varied from approximately 1:1 to about 4:1. In the absence of HFP, the homopolymer of VDF is a high melting crystalline solid. A 4/1 mixture of the two monomers may be polymerized and crosslinked to produce an elastomeric material which is fairly resistant to solvents and high temperatures.

FEP

Fluorinated ethylene propylene (FEP) is created by polymerizing tetrafluoroethylene (TFE) and hexafluoropropylene (HFP), as shown:

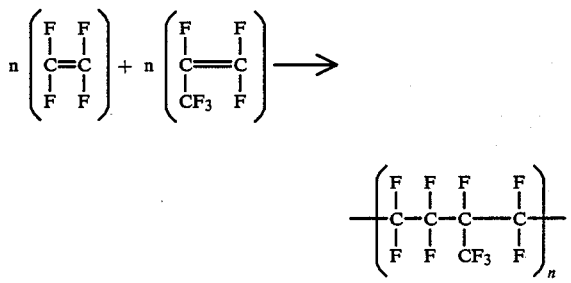

This substance has a lower melting point (in the range of about 260°0 to 280° C.) than the TFE homopolymer (about 360° C.). In its highly crystallized state, it is a "resin", which implies that the material is tough or hard, rather than elastomeric. It is also "thermoplastic", in that it retains its shape while cool, but may be heated to a fluid state, reshaped, and recooled to retain the new shape.

FEP "Teflon" is sold by the DuPont Company; it is distinguished from PTFE "Teflon" by being processable at lower temperatures and with less decomposition than PTFE "Teflon".

TFEP

Tetrafluoroethylene propylene (TFEP) is created by reacting tetrafluoroethylene with propylene to create a polymer, as shown in the following example reaction:

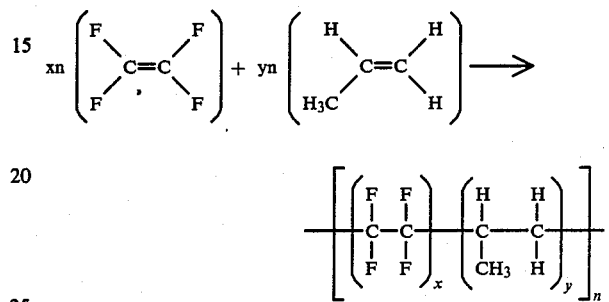

This material may be crosslinked by radiation or other techniques, as shown in the following example reaction:

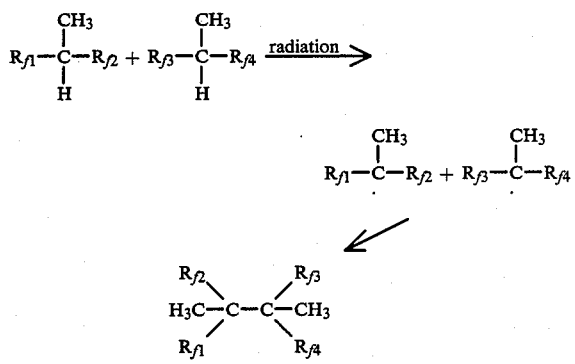

In the absence of propylene, the homopolymer of TFE is crystalline and melts at 360° C., while in the absence of TFE, the stereoregular homopolymers of propylene melts around 220° C. Irregular homopolymers of propylene do not crystallize, and are used as low molecular weight oils and waxes.

If more than 50 mole-percent TFE units are incorporated in a copolymer of TFEP, sequences of TFE blocks form which have the high-melting characteristics of PTFE. This effectively creates a dispersion of crystalline micro-units within a matrix of elastomeric material, causing the elastomeric material to stiffen.

Methods of polymerizing and crosslinking TFEP are the subjects of numerous patents. For example, U.S. Pat. No. 3,467,635 (Brasen et al, 1969) describes elastomeric copolymers of TFE and olefins such as propylene. U.S. Pat. No. 3,718,558 (Tabata et al, 1973) describes the use of ionizing radiation to crosslink TFEP copolymers. U.S. Pat. No. 3,723,270 (Tabata et al, 1973) describes the use of ionizing radiation to polymerize TFE and propylene in a non-polymerizing medium of solvent or swelling agent. U.S. Pat. No. 3,825,510 (Yamamoto et al, 1974) describes the use of di-peroxy compounds to crosslink TFEP copolymers. U.S. Pat. No. 3,846,267 (Tabata et al, 1974) describes the use of compounds such as amines and basic oxides to accelerate the crosslinking of TFEP copolymers. U.S. Pat. No. 3,892,641 (Tabata et al, 1975) describes the use of radiation and perfluoro dispersing agents to create high molecular weight copolymers.

TFEP is available under the trademark "Aflas" from Asahi Glass Co. (Japan) through Xenox Corporation (Houston, TX), with a variety of grade dsignations such as "Aflas 100" and "Aflas 150." These materials have characteristics which are described in literature that is published and distributed by Asahi Glass Co. and Xenox Corp.

EPDM

Ethylene propylene diene (EPDM) is created by polymerizing ethylene and propylene, along with a small quantity of a diene which provides unsaturated moieties, as shown in the following example reaction:

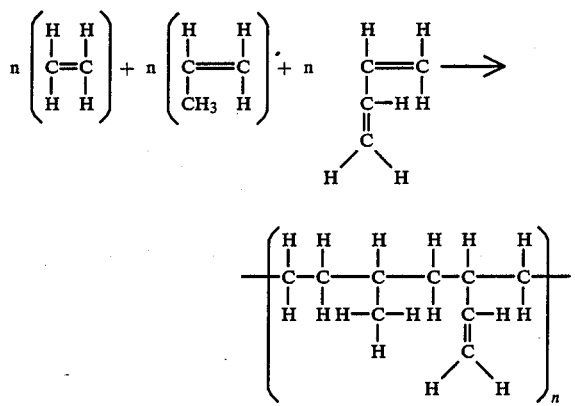

Unsaturated moieties can react to provide crosslinks between molecules.

When 50 mole-percent or less of ethylene is incorporated, the copolymer is a non-crystallizing rubber with good low-temperature properties. At higher ethylene content, block sequences of ethylene units form and crystallize, causing the rubber to become stiff. At very high proportions of ethylene, the product is not rubber, but becomes a thermoplastic resin.

Several types of EPDM are available under the trademark "Nordel" (Dupont Corporation).

All of the foregoing materials have serious drawbacks when used under adverse conditions which are encountered in geothermal, chemical processing or other hostile environments. Each material has a range of operating limitations, and can be degraded or destroyed if those limitations are exceeded. The materials which resist degradation tend to be insufficiently elastomeric, and vice-versa. There is an important and growing need for materials with elastomeric and chemical properties that are superior to the properties of the foregoing materials.

DISCLOSURE OF THE INVENTION

This invention relates to a method for preparing perfluorinated elastomeric materials, and to elastomers made by this method. This method comprises the perfluorination of a polymeric compound which has been carefully selected or synthesized so that it has several desired characteristics:

a. the polymeric backbone chains must have a suitable number of moieties attached;

b. partial fluorination, which perferably should occur by incorporation of one or more fluorine-containing monomers in the polymerization reaction. The degree of partial fluorination must be sufficiently low to allow satisfactory crosslinking, yet sufficiently high to prevent excessive breakage of backbone chains during the perfluorination reaction;

c. the partially fluorinated polymeric backbone chains must be crosslinked to a desired degree by means which did not cause excessive breakage of backbone chains.

The perfluorination reaction must be performed under controlled conditions which cause perfluorination without causing excessive breakage of backbone or crosslinking bonds in the compound being perfluorinated.

By carefully selecting appropriate starting materials (which may be commercially available polymeric compounds) and by carefully controlling each parameter of each reaction involved, the Applicants have successfully created elastomers which are superior to previously known elastomers in their ability to perform under hostile conditions.

Best Mode of Carrying Out The Invention

In one preferred embodiment of this invention, the starting materials used are the two monomers tetrafluoroethylene (TFE) and propylene. These monomers are reacted to form TFEP, as shown by the following formula:

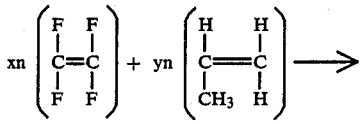

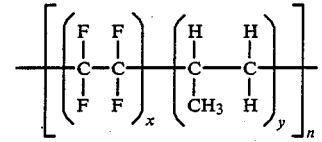

where x and y are numers that indicate a TFE/P molar ratio ranging from about 9/1 to about 2/8, and preferably about 7/3 to about 3/7, and especially about 6/4 to about 45/55. The copolymers can be prepared by bulk polymerization, solution polymerization, emulsion polymerization, or other conventional techniques. Preferably, polymerization should be initiated by methods that do not leave undesired molecules within the polymer, such as high energy ionizing radiation, (for example, as described in U.S. Pat. No. 3,718,558 (Tabata et al, 1973)), thermoplymerization, or photopolymerization. However, polymerization which is initiated by catalysts or other chemical initiators that leave initiator fragments or other molecules in the polymer might be useful to create materials of this invention which may be suitable for specific uses, as may be determined through routine experimentation.

In an alternate embodiment of this invention, a commercially available polymerized form of TFEP, sold under the trademark "Aflas" (Xenox Corp., Houston, TX), is used as the starting material.

The polymeric TFEP molecules are crosslinked. One preferred method for performing the crosslinking is to irradiate a mixture of TFEP molecules with electrons with an appropriate energy level, such as about one million electron volts (Mev). Such electrons are capable of detaching hydrogen free radicals from carbon-hydrogen bonds. Hydrogen radicals react with each other to form hydrogen gas, which diffuses out of the polymeric material. The removal of a hydrogen free radical from a carbon-hydrogen bond leaves behind a radical site at the carbon atom. Such carbon radicals are highly reactive, and react with each other to form crosslinks between backbone carbon chains, as shown below:

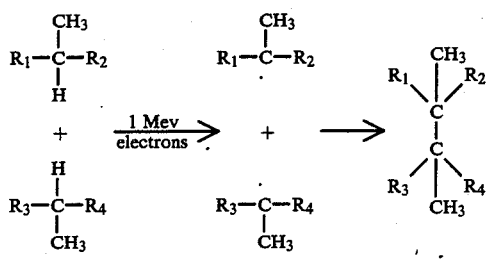

An important aspect of this invention is to control the starting material and the crosslinking methods in order to cause a high degree of crosslinking and yet a low degree of scission. Scission involves the breakage of a carbon-carbon bond, or possibly another type of bond, depending upon the polymer being crosslinked. It usually involves polymer fragmentation, which occurs when a carbon-carbon bond in a backbone chain is broken. Scission is detrimental to the desired reaction. To minimize scission, several reaction parameters must be controlled, such as the temperature of the polymer and the absence of impurities.

If electron radiation is used, then the amount of energy per electron (i.e., the velocity of each electron, expressed in terms of millions of electron volts, Mev) and the rate of electron bombardment (i.e., the number of electrons per unit of time, expressed in terms of Megarads per minute) must be controlled. Research by the Applicants indicates that a radiation rate of about 1 Megarad (Mrad) per minute, using electrons having about 1 Mev of energy per electron, is suitable for crosslinking thin-film TFEP. It is preferred to conduct such radiation in an environment of inert gas, such as nitrogen or helium. It is also preferred to maintain the TFEP at an optimal temperature, which may be determined for any specific polymer or crosslinking conditions by routine experimentation. Research by the Applicants indicated that room temperature (about 20° to 25° C.) and a temperature of about 85° C. were suitable for cross-linking thin-film TFEP. The desired temperature may be maintained by conventional techniques, such as a water bath.

The total radiation dosage, which is a function of the duration of exposure multiplied by the rate of exposure, affects the degree of crosslinking. A highly crosslinked material tends to be stiff and tough; a lightly crosslinked material tends to be stretchable and flexible. The degree of crosslinking may be controlled to create a variety of materials with stiffness, elasticity and other properties which are appropriate for a variety of uses, by controlling the total radiation dosage. The research by the Applicants involving radiation dosages ranging from about 15 to about 80 Mrad, are presented in the Example and Tables.

The crosslinking reaction may be followed by heat treatment ("curing") of the crosslinked material to remove undesired molecules, such as hydrogen gas, unreacted monomers, and free radical sources. To cure the crosslinked samples, Applicants heated them to 170° C. for about 12 to 36 hours in the presence of nitrogen gas or vacuum.

The resulting crosslinked elastomeric material is then fluorinated under carefully controlled conditions. This may be done by placing the material within a reactor vessel made of appropriate material such as Monel alloy, and contacting it with a flow of inert gas such as helium, mixed with gradually increasing concentrations of fluorine gas ($F_2$). The temperature, pressure, and concentration of the gas, and the duration of the reaction, may be modified to achieve relatively high degrees of fluorination. However, since fluorination may destroy crosslink and backbone bonds between carbon atoms, it is necessary to carefully control and optimize the reaction parameters and to cure the elastomer after the reaction is complete. Fluorination parameters and the results thereof, are indicated in the Examples and Tables. At the end of this treatment, the material should be removed and cured, preferably by heating the material in the presence of an inert gas, to remove hydrogen gas, hydrogen fluoride, unreacted fluorine, fragmented polymers, and other undesired molecules.

As used herein, the terms "fluorine reactor" and "fluorination reactor," and "reactor vessel" are used interchangeably to include any device or apparatus which is suitable for containing a piece of polymeric material and which is equipped with means for contacting the material with fluorine, such as fluorine gas. A variety of fluorine reactors are known to those skilled in the art [5].

ALTERNATE MODES OF CARRYING OUT THE INVENTION

In general, this invention comprises methods of creating elastomers that have superior characteristics compared to previously available elastomers. Sufficient information is provided to teach those skilled in the art how to make and use such elastomers, and examples are provided regarding two such elastomers. However, those skilled in the art will recognize that a variety of fluorocarbon elastomers may be created by the methods of this invention. Although such elastomers may have characteristics which may be inferior to the optimal properties that are achievable by this invention, such elastomers may nevertheless be suitable for one or more useful purposes; if created by the methods of this invention, such materials are within the scope of this invention.

The following discussion is an effort to provide information on the range of materials and methods that may be suitable for use within this invention. Whether any such material or method is in fact suitable, and the optimal parameters for conducting any reaction described herein, may be determined through routine experimentation by those skilled in the art.

NON-CROSSLINKED POLYMERIC MATERIALS

In general, suitable polymeric material should have the following characteristics before it is crosslinked. It should have a backbone chain comprising carbon atoms. In one preferred embodiment, the backbone chain should not contain non-carbon atoms, such as oxygen, sulfur, or nitrogen, or aromatic groups. Alternately, backbone chains which contain aromatic groups or atoms other than carbon may be utilized to create elastomeric materials by the methods of this invention; such elastomeric materials may have properties which are preferred for specific uses, as may be determined by those skilled in the art.

Moieties should be attached to the backbone chains of the polymeric molecules. The number of moieties (often expressed in terms of number of moieties per 100 backbone carbon atoms) can be controlled to a large extent by conventional techniques known to those skilled in the art, such as varying the stoichiometric ratio of differing monomers involved in the polymerization reaction. The size and characteristics of the moieties may be controlled by proper selection of the monomers to be used in the polymerization reaction.

For any specific use, there are likely to be optimal and suitable ranges in the number and size of moieties on the non-crosslinked polymers. Such ranges can be determined through routine experimentation by those skilled in the art. A variety of considerations will be involved in such determinations. If a direct fluorination reaction is performed on the polymers before they are crosslinked, the reaction is likely to be commenced at low temperatures. In general, it may be presumed that the polymeric molecules should not crystallize at the temperatures used. Crystalline molecules tend to be packed together more tightly than non-crystalline moieties. It is more difficult for fluorine atoms to penetrate into crystalline polymers than into non-crystalline polymers. Therefore, crystallization may lead to irregular fluorination.

However, any problems related to a partial fluorination reaction can be avoided by avoiding the reaction; this can be accomplished by utilizing one or more monomers which contain the desired amount of fluorine. In addition, one or more factors may tend to offset potential disadvantages caused by crystallization. For example, the temperature of the reaction vessel may be increased during the partial fluorination reaction; this may eliminate any crystals that formed at low temperatures, and increase the regularity of the fluorination. Second, irregular partial fluorination may lead to irregularities in the crosslinking. Such irregularities may lead to certain advantageous properties in the final material. For example, microscopic crystals or other irregularities dispensed in a matrix of regular elastomeric material tend to decrease the flexibility and increase the stiffness of the elastomer; for many uses, this effect may be beneficial.

It should also be noted that crosslinking bonds between backbone chains tend to impede crystallization. This effect is similar to the effect of moieties on backbone chains, although the two factors operate differently. The apparent effects of the number and nature of moieties, correlated with the number and nature of crosslinking bonds, can be determined by those skilled in the art.

In one preferred embodiment, moieties should be attached to the backbone chain at regular or random intervals, to reduce potential crystallization. In an alternate embodiment, backbone chains with relatively lengthy blocks of moiety-free atoms may produce elastomers with high stiffness or other advantageous properties. The moieties may comprise alkyl groups (such as methyl, ethyl, propyl, butyl or other groups), cyclic or aryl groups (such as cyclohexyl, phenyl, tolyl or other groups) or other groups such as methoxy groups. Moieties of any practicable length or configuration may be created by polymerizing appropriately selected monomers, using techniques known to those skilled in the art. Although there is no known maximum moiety size beyond which the resulting elastomer would not be suitable for any use, it is likely that relatively small moieties will provide elastomers with the desired characteristics. Therefore, appropriate unsaturated monomers probably should contain from about two to about eighteen carbon atoms; the optimal monomers for any desired application may be determined through routine experimentation.

The moieties may contain unsaturated bonds, oxygen atoms, amines, or other elements or properties; such moieties may be useful to impede crystallization or to promote crosslinking. However, such moieties should not interfere with the crosslinking or fluorination processes, or cause scission of carbon-carbon bonds, or lead to molecular fragments which cannot be conveniently removed by curing or other treatment. Moieties capable of forming crosslinking sites may cause or promote crosslinks wherein one or more carbon or other atoms are located between two backbone carbon atoms. Such crosslinked materials are within the scope of this invention.

The backbone must be partially fluorinated, i.e., both fluorine atoms and replaceable atoms (such as hydrogen, chlorine or bromine) must be attached to it. In order to optimize the properties of the resulting elastomer, a suitably balanced number of fluorine atoms and replaceable atoms must be attached to the backbone chain. At one extreme, polymer backbones which contain no fluorine may be easily crosslinked, but they tend to yield friable, brittle products when fluorinated. Therefore, suitable polymers should contain at least about 10 mole percent fluorine. At the other extreme, highly fluorinated backbones such as polytetrafluoroethylene (PTFE) are difficult to crosslink, since they have few or no hydrogen atoms which can be removed to create crosslinking sites. Preferable fluorine concentrations range from about 20 mole % to about 65 mole %. For example, polymers which may be crosslinked and then perfluorinated by the methods of this invention include tetrafluoroethylenepropylene (TFEP) and vinylidene fluoridehexafluoropropylene (VDFHFP). The fluorine content of several compositions of TFEP and VDFHFP is as follows:

| TFEP in a 4:1 ratio $C_{11}H_6F_{16}$ | (TFE:P) 48 mole % F |
|---|---|
| TFEP in a 1:2 ratio $C_8H_{12}F_4$ | 17 mole % F |
| VDFHFP in a 4:1 ratio $C_{11}H_8F_{14}$ | (VDF:HFP) 42 mole % F |
| VDFHFP in a 1:4 ratio $C_{14}H_2F_{26}$ | 62 mole % F |

It is believed to be preferaable to use polymers having hydrogen atoms (or other replaceable atoms) which are bonded to tertiary carbon atoms (i.e., carbon atoms which are bonded to three other carbon atoms), since such hydrogen atoms are removed from carbon atoms, thereby creating free radical crosslinking sites, more easily than hydrogen atoms can be removed from secondary or primary carbon atoms. This may allow for crosslinking treatment using less reactive methods or reagents (e.g, electron radiation using electrons with less than 1 Mev energy, or a lower concentration of peroxide) which may reduce the amount of undesirable scission that occurs during crosslinking. For example, TFEP (which has hydrogen atoms bonded to tertiary carbon atoms) provides a crosslinked, perfluorinated elastomer which is believed to be somewhat superior to elastomer made from VDFHFP, which has hydrogen atoms bonded to secondary but not tertiary carbon atoms. In addition, the bond between a hydrogen atom and a carbon atom tends to be weakened by the electronegativity of fluorine atoms attached to the same or adjacent carbon atoms.

It is possible to create the desired pre-crosslinked materials by selecting, mixing and polymerizing appropriate monomers, using techniques that are known to those skilled in the art. Alternatively, the methods of this invention may be performed using polymeric materials such as TFEP or VDFHFP which are, or which may become, commercially available. In addition, it is possible to perform the crosslinking and perfluorination reactions of this invention on mixtures of polymers. Such mixtures may be homogeneous (compatible or miscible) or heterogenous (incompatible or immiscible).

The term "backbone" is understood and commonly used by those skilled in polymer technology. In general, a backbone is a long chain of carbon or other multivalent atoms which are linked to each other by a polymerization reaction involving monomers. There is no specific length criterion, although most polymers tend to have molecular weights in the range of about 10,000 to about 10,000,000 daltons. To some extent, it is possible to control the length of polymeric molecules by polymerization techniques which are known to those skilled in the art.

SOLVENTS AND SHAPING

Polymers that meet the guidelines discussed above may be dissolved in various known solvents, such as tetrahydrofuran, acetone, or ethyl acetate, or in other solvents or solvent mixtures which may be determined through routine experimentation by those skilled in the art. Dissolution may require a substantial period of time, as well as agitation and mild heating. After the solution is shaped as desired, the solvent is evaporated; if desired, mild heat and vacuum may be used to accelerate the solvent evaporation.

When a solution of polymer having the desired characteristics is obtained, it may be formed into desired shapes by techniques which are known to those skilled in the art, such as solvent casting. Various methods may be used to shape polymers which can be heated to a suitable temperature and made to flow under pressure, such as extrusion, transfer molding, blow-molding, injection molding, and vacuum drawing. Several shaping techniques, such as machining, grinding, and thermal quenching, may be useful after the material has been crosslinked.

In order to prepare thin-film samples for testing, polymeric starting materials may be dissolved in solvent and poured onto aluminum foil that is affixed to a flat plate of glass or other material. The solvent may be slowly evaporated, and the foil and film may be detached from the plate for further treatment.

CROSSLINKING METHODS

As described above, electron radiation is a preferred method for crosslinking polymeric starting materials.

It is possible to use other methods of crosslinking in lieu of or possibly in addition to electron radiation. For example, a source of free radicals, such as benzoyl peroxide or dicumyl peroxide, may be added to various polymers which are then heated to cause crosslinking. Various other substances such as triallyl isocranurate, poly(1,2 vinyl)-butadiene, or trimethylol propane trimethacrylate may be added to increase the efficiency of the crosslinking process. However, such compounds may result in bubbles, blisters, and other sources of weakness in fluorinated polymers. Whether they are suitable to create fluorinated elastomers for a specific application, and the optimal parameters for conducting reactions of this nature, may be determined through routine experimentation by those skilled in the art.

It may also be possible to use gamma radiation to crosslink polymeric starting materials. In general, gamma radiation tends to penetrate deeper than electron radiation into polymeric materials. Therefore, gamma radiation may be a preferred method of crosslinking relatively thick specimens. However, gamma-induced crosslinking tends to proceed more slowly than electron radiation. Whether gamma radiation is suitable for use in this invention, and the optimal procedures and parameters for utilizing gamma radiation for specific applications, may be determined through routine experimentation by those skilled in the art.

It may also be possible to utilize ultraviolet radiation to crosslink polymeric starting materials. However, ultraviolet radiation usually does not penetrate deeply into a polymeric substance. Therefore, its use may be limited to crosslinking thin films or to creating a shallow layer of "skin" which is more densely crosslinked than the interior of a polymeric article.

During the crosslinking process, the material should be maintained at a temperature which is high enough to promote crosslinking yet which is low enough to control scission. Appropriate temperatures for any given application may be determined through routine experimentation. For example, an appropriate temperature for crosslinking TFEP or VDFHFP is likely to be in the range of about 25° C. to about 150° C.

It is possible to mix various substances such as MgO, PbO, ZnO, or CaO, with a polymeric starting material before it is crosslinked. Such substances tend to accelerate the crosslinking reaction, and to absorb or react with HF and other acids, both of which are beneficial effects. However, such substances may cause or aggravate adverse effects during fluorination. The suitability of any such compound for a specific application may be determined by those skilled in the art.

After a polymer is crosslinkied, it should be cured to remove hydrogen gas, fragmented polymers, and other reactive or undesired molecules from the polymer. Curing is normally done by heating the polymer to an elevated temperature for a certain length of time. If desired, the polymer may be subjected to some degree of vacuum to accelerate the curing process, but the vacuum should not be so great that it causes bubbles, blisters, or other problems. During curing, the polymer should be surrounded by a relatively nonreactive gas, such as helium or nitrogen. Optimal values for relevant curing parameters for any specific application may be determined through routine experimentation.

FLUORINATION METHODS

As discussed above, direct fluorination using fluorine gas ($F_2$) is a preferred method of this invention. However, indirect fluorination, which uses substances such as $CoF_3$, $MoF_6$, $SF_4$, or other inorganic fluorides which release fluorine when heated or otherwise manipulated, may be a satisfactory method of fluorinating crosslinked polymers according to this invention. The preferred form of fluoride substance, and the optimal reaction conditions, for any application may be determined through routine experimentation.

Direct fluorination of a substance involves contacting the surface of the polymer with fluorine gas. The extent to which fluorine atoms penetrate into the interior of a crosslinked polymer is a function of several parameters, including pressure, temperature, and the nature of the polymer. It may be desirable to increase the penetration of fluorine into a crosslinked polymer; this increases the thickness of elastomeric pieces which may be made according to this invention.

It is possible to swell a crosslinked polymer with an appropriate solvent, such as a fully halogenated hydrocarbon such as freon or perfluorokerosene. Such swelling may be performed under conditions of elevated temperature and pressure. If carefully controlled, swelling causes the polymeric molecules to extend to a stretched configuration with minimal breakage of backbone or crosslinking bonds. Small molecules such as fluorine or inorganic fluorides usually penetrate more deeply into a swollen polymer than a non-swollen polymer. After fluorination is complete, the polymer should be treated to remove the solvent. Such treatment may be performed by elevated temperatures, possibly using a mild vacuum.

It is also possible to alternate one or more crosslinking and fluorination steps.

Perfluorination ideally indicates that each replaceable atom (such as hydrogen) in a compound has been replaced by a fluorine atom. However, in actual conditions, it may be difficult or impossible to replace every replaceable atom with fluorine, or to detect whether every replaceable atom has in fact been replaced. Therefore, perfluorination is used herein in a non-ideal, functional sense to indicate that extensive fluorination has been performed with the purpose and practical effect of replacing the large majority, or substantially all, of the replaceable atoms with fluorine atoms. For example, an analysis might indicate that the economically optimal material for a given use might be achieved by curtailing the fluorination reaction, thereby reducing expenses, at a given level of fluorination even though it is known that a small percentage of residual hydrogen atoms remain within the compound. Despite the presence of the residual hydrogen atoms, such a compound should be regarded as "perfluorinated" and, if created by the method of this invention, it would be within the scope of this invention. "Replaceable atoms" is used herein in a functional sense to include atoms which can be displaced from a molecule by fluorine atoms during a direct fluorination reaction without causing scission, fragmentation, or other undesired alteration of said molecule.

FILLERS, LUBRICANTS AND PLASTICIZERS

Many fillers that are commonly used in the practice of polymer science and technology, such as silica, calcium carbonate, glass powder or glass fiber, are attacked by fluorine. While such fillers may be tolerable in some applications, they are not generally recommended for use within this invention.

The preferred fillers are carbon blacks which may be physically absorbed by or chemically bound to the polymer. These may be fluorinated to any degree desired before being compounded with the elastomers, or they may be nonfluorinated carbon blacks conventionally used in the rubber industry. Fluorinated or unfluorinated graphites, fibers and powders of fluorinated or unfluorinated polymers, and inorganic fluoride fillers may also be useful for specific applications, as may be determined by those skilled in the art. Metal fluorides or other fillers which release fluorine at elevated temperatures may be heated in order to remove volatile fluorine, and may subsequently function as fillers.

Normally, filler material is incorporated within crosslinked polymers by mixing the filler, in powdered or fibrous form, with the polymer before the polymer is crosslinked. The optimal filler for any specific application, and the optimal method for incorporating any filler into any perfluorinated crosslinked polymer, may be determined through routine experimentation using conventional techniques that are known to those skilled in the art.

Lubricants are often used to reduce friction at the interface between an elastomer and a mating part or other surface. Such lubricants should not diffuse into an elastomeric material, since diffusing lubricants tend to become unavailable at the interface. Fluorocarbon or perfluoroether fluids, which tend to be more stable than most hydrocarbon lubricants, are preferred lubricants for use at elevated temperatures.

It is common to add plasticizers (i.e., small molecules which dissolve in the polymer) to brittle or glassy materials if their intended use requires flexibility. For example, dioctyl phthalate is added to polyvinylchloride to produce flexible plastic sheets for upholstery in automobiles. If a fluorinated elastomer product is to be used below its glass temperature, which may occur in cold weather conditions, such an additive may be desired. Suitable plasticizers which will not be destroyed during perfluorination are likely to include partially or fully halogenated molecules such as 1,1,2 trichloro 1,2,2 trifluoroethylene and perfluorokerosene, as may be determined through routine experimentation. Plasticizers may be incorporated within the materials of this invention using conventional techniques known to those skilled in the art.

ANALYTICAL TECHNIQUES AND RESULTS

Crosslinked fluorinated elastomers may be analyzed by a variety of techniques. Such techniques include:

(1) Thermogravimetric analysis. In this process, a sample is placed in an inert atomsphere, and heated at a known rate, such as 10° C. per minute. The sample is continuously or intermittently weighed, to determine the amount of weight loss as a function of increasing temperature.

(2) Swelling in solvent. Halogenated organic solvents, such as trichlorotrifluoroethane, are capable of dissolving uncrosslinked polymeric molecules and diffusing into crosslinked molecules causing swelling. A highly crosslinked elastomer will not swell as extensively as a lightly crosslinked elastomer. To evaluate swelling, a sample of elastomeric material is immersed in solvent, and at periodic intervals is removed, quickly blotted, and weighed or otherwise measured. This provides an indication of the amount of crosslinking in the sample.

(3) spectroscopic analysis, using infrared or other wavelengths. Different types of chemical bonds absorb infra-red radiation of different wavelengths. For example, carbon-hydrogen bonds tend to absorb infra-red light with relatively short wavelengths, while carbon-fluorine bonds tend to absorb infra-red light with somewhat longer wavelengths. By passing a beam of infra-red light through a thin sample of material, and analyzing the absorption of light at various wavelengths, it is possible to obtain information about various types of bonds within the sample.

(4) Strength and elasticity tests. A highly crosslinked elastomer tends to be stiff and strong; a lightly crosslinked elastomer tends to be soft and flexible. Mechanical tests are available which measure several types of deflection and deformation, such as the amount of elongation before breakage under tension, the amount of tension required to break a sample, and the amount of compression as a function of pressure. Such tests may be performed by calibrated equipment using samples with controlled crossectional areas, or by simply handling the material being examined.

(5) Degradation testing. In this method, a sample of the material is immersed in hot brine, solvent, corrosive fluids or gases, or other adverse conditions. The sample is removed, if necessary, and examined periodically to determine its rate of deterioration. Such examination may include the tests listed above, although spectroscopic analysis may be limited by discoloration of the sample.

The elastomeric materials of this invention have a relatively high degree of resistance to electrical current. Therefore, they are useful in situations requiring electrical insulation material which is chemically stable and resistant to degradation. In addition, the materials of this invention can be prepared in sheets which are sufficiently thick to prevent the diffusion or permeation of most types of compounds (such as toxic chemicals) through them. Such materials are useful in a variety of applications, such as protective clothing. In addition, the materials of this invention can be prepared in various forms that are transparent to visible light and/or other electromagnetic radiation. Such materials are useful in a variety of applications. The materials of this invention have relatively high resistance to degradation caused by ultraviolet rays and other types of energetic radiation. Therefore, they are useful for a variety of purposes, such as coatings for solar energy devices.

EXAMPLES

EXAMPLE 1: Polymers Used as Starting Materials

Five commercially available types of vinylidene fluoride-hexafluoropropylene (VDFHFP) (Dupont Co., Wilmington, Del.) were used as starting materials. These polymers are designated by the supplier's trademark "Viton" and by the following grade designations: C-10, A-35, A, A-HV, and GH. After being crosslinked and fluorinated by the methods described in the following examples, these materials were designated as "EXF-I" perfluorinated elastomers.

In addition, two commercially available types of tetrafluoroethylene propylene (TFEP) (Xenox Corp., Houston, TX) were used as starting materials. These polymers are designated by the supplier's trademakr "Aflas" and by the grade designations 100 and 150. After being crosslinked and fluorinated by the methods described below, these materials were designated as "EXF-II" perfluorinated elastomers.

In addition, two commercially available types of ethylene propylene diene (EPDM) (Dupont) were used as starting materials. These polymers are designated by the supplier's trademark "Nordel" and by the grade designations 1070 and 1470. After being crosslinked and fluorinated by the methods described below, these materials were designated as "EXF-III" perfluorinated elastomers.

Several characteristics of the starting materials are listed in Table 1. The information therein has been extracted from product brochures or obtained from experiments on a small number of samples which tend to vary substantially in characteristics; therefore, the data in Table 1 should not be regarded as authoritative. Thermogravimetric analyses (TGA) were performed on a Dupont Model 951 thermogravimetric analyzer used in the dynamic mode.

TABLE 1

| STARTING POLYMER | Mol. % F Mol. % H | Mooney Viscosity | Temp (C.) at TGA Weight Loss: 1% | 3% | 50% | Elongation (%) | Tensile Strength (psi) |
|---|---|---|---|---|---|---|---|
| TFEP | | | | | | | |
| Aflas 100 | 53.5 / 4.22 | 100 (100° C.) | n/a | n/a | n/a | 200–350% | 2800–3200 (with carbon black) |
| Aflas 150 | 53.5 / 4.22 | 85 (100° C.) | 405 | 420 | 484 | 200–350% | 2800–3200 (with carbon black) |
| VDFHFP | | | | | | | |
| Viton C-10 | 65.5 / 1.97 | 7–17 (100° C.) | 315 | 420 | 484 | n/a | n/a |
| Viton A-35 | | 32–42 (100° C.) | 380 | 420 | 473 | 100–300 | 1000–2000 |
| Viton A | | 59–71 (100° C.) | 400 | 420 | 474 | 100–300 | 1000–2500 |
| Viton A-HV | | 147–173 (121° C.) | n/a | n/a | n/a | 100–300 | 1000–2500 |
| Viton GH | n/a | n/a | n/a | n/a | n/a | n/a | n/a |
| EPDM | | | | | | | |
| Nordel 1070 | 0 / 14.28 | 70 | 230 | 350 | 450 | n/a | n/a |
| Nordel 1470 | 0 / 14.28 | 70 | 210 | 320 | 436 | n/a | n/a | n/a: Not available

The samples were heated from room temperature to 650° C. at a rate of 10° C./min in 90 cc/min nitrogen gas flow.

EXAMPLE 2: Crosslinking Procedures

The polymers listed in Table 1 were dissolved in solvent and solvent-cast on aluminum foil supported by glass plates. The solvent was evaporated by heating the films to temperatures ranging from about 15° C. to about 50° C., for periods ranging from about 0.1 hours to about 20 hours. The dry thickness of most samples ranged from about 0.25 mm to about 2 mm. Some of the samples were cast in single layers (sl), and some were cast in double layers (dl).

After drying, the films and aluminum foil were separated from the glass plates and placed inside polyethylene bags. The bags were flushed with nitrogen gas for several minutes, sealed, and placed in shallow trays, some of which contained water at 85° C.

The samples were then subjected to electron radiation with an energy level of about 1 Mev, at a dosage of about 1 Mrad/minute for varying periods of time, indicated in Table 2. The crosslinking was performed by a Vandegraff accelerator (High Voltage Engineering, Burlington, MA) at the State Univ. of New York at Buffalo.

EXAMPLE 3: Testing of Crosslinked Polymers

The polymers that were crosslinked and cured as described in Example 2 were cut into 1 inch squares, immersed in solvent, and allowed to swell until they reached equilibrium, as determined by visual monitoring. They were taken out and weighed, and the results are indicated in Table 2. A low weight gain indicates extensive crosslinking. A very high weight gain for certain VDFHDFP samples in the range of 200% or more, indicates that the sample broke into fragments.

Some of the samples were not immersed in solvent, but were tested for strength and elongation using an Instron tester with a 1 inch gauge length; samples were extended at 0.5 inch/minute. Data from these tests are indicated in Table 3.

TABLE 2

SOLVENT SWELLING OF CROSSLINKED POLYMERS

| Starting Polymer | Radiation Dosage (Mrad) | Curing Treatment | Casting Solvent, Swelling Solvent | Weight Gain % | Time to Reach Maximum Weight |
|---|---|---|---|---|---|
| Aflas 150 | 15 | 170° 44 hr. | THF Ethyl Acetate | 70% | n/a |
| | 15 | None | Ethyl Acetate " | 34% | n/a |
| | 15 | None | Freon 113 Ethyl Acetate | 35% | n/a |
| | 30 | None | Ethyl Acetate | 44.1% | 15 min. |
| | 30 | None | Freon 113 | 91.5% | 5 min. |
| | 30 | None | Freon 113 " | 86% | n/a |
| | 30 | None | Ethyl Acetate " | 31% | n/a |
| Aflas 100 | 60 | None | Freon 113 " | 85% | n/a |
| | 60 | None | Ethyl Acetate " | 43% | n/a |
| | 60 | None | Ethyl Acetate | 66.6% | 5 min. |
| | 60 | None | Freon 113 | 85.2% | 44 hrs. |
| Viton A-HV | 15 | None | Ethyl Acetate | 328.5% | 15 min. |
| | 15 | None | Freon 113 | 21.2 | 124 hrs. |
| | 15 | None | Freon 113 Freon 113 | 20% | n/a |
| | 15 | None | Ethyl Acetate " | 294% | n/a |
| Viton A-HV | 30 | None | Ethyl Acetate " | 28% | n/a |
| | 30 | None | Ethyl Acetate " | 378% | n/a |
| | 60 | None | Ethyl Acetate | 85.6% | 1 min. |
| | 60 | None | Freon 113 | 3.9% | 1 hr. |
| | 60 | None | Acetone Ethyl Acetone | 238% | n/a |
| | 60 | None | Freon 113 Freon 113 | 20% est. | n/a |
| Viton GH | 20 | 85° C./1 hr | Ethyl Acetate " | 197% | n/a |
| | 20 | 170° C. 44 hr flushed with N2, Wt. loss 30.1% | Ethyl Acetate " | 255% | n/a |

TABLE 3

TENSILE TESTING OF CROSSLINKED POLYMERS

| Polymer | Radiation Dosage (Mrad) | Elongation at Break (%) | Tensile Strength at Break (lb/in$^2$) |
|---|---|---|---|
| Aflas 150 (sl) | 15 | 334 | 497 |
| Aflas 150 (sl) | 30 | 215 | 170 |
| Aflas 150 (dl) | 80 | 19.8 | 1113 |

EXAMPLE 4: Perfluorination Procedures

The polymers that were crosslinked as described in Example 2 were perfluorinated by the following methods. Each sample, comprising a 4"×4" square cut from a thin film of crosslinked polymer, was placed on copper gauze in a reactor chamber of Monel alloy, internal volume 1.4 liters. The chamber was then subjected to a continuous flow of helium at room temperature for a sufficient period of time to thoroughly flush oxygen, water, and other reactive molecules from the chamber. Fluorine gas was then added to the helium flow. The helium flow was then decreased to zero in a stepwise fashion while the fluorine flow was maintained or increased. This effectively increased the concentration of fluorine gas in the reactor chamber, until pure fluorine gas surrounded the sample. On several runs, the pressure of the fluorine gas was increased to 35 psi after the helium flow was discontinued. In addition, the temperature of the reaction chamber may be increased gradually during the fluorination reaction.

The specific concentration, duration, and temperature parameters varied somewhat between samples. Table 4 lists the ranges of parameters that were used for typical run which produced perfluorinated elastomers with very good strength and durability. These parameters may be adjusted to determine optimal values by routine experimentation.

TABLE 4
TYPICAL PERFLUORINATION PARAMETERS

| Fluorine flow, cc/min | Helium flow, cc/min | Time, hours | Temperature °C. | Pressure, psia $F_2$ |
|---|---|---|---|---|
| 0 | 100 | 4 to 8 | Room temp. | |
| 0.2 | 100 | 2 to 12 | −78 | 15 |
| 0.5 | 50 | 2 to 12 | −78 | 15 |
| 1.0 | 20 | 4 to 8 | gradient | 15 |
| 2.0 | 0 | 4 to 12 | Room temp. | 15 |
| 4.0 | 0 | 12 to 24 | Room temp. | 30 to 65 |
| 0 (Curing) | 100 | 8 to 24 | Room temp. | ·15 |

EXAMPLE 5: Testing of Perfluorinated Elastomers 4. thermogravimetric analysis (TGA), using the procedures described in Example 1. Results of these tests are indicated in Table 7.

5. spectroscopic analysis, using a Perkin-Elmer Infrared Spectrophotometer Model 297; the thin film was placed in the sample beam and an attenuator was placed in the reference beam.

6. degradation testing. The samples were autoclaved at Brookhaven National Laboratories in a solution of 25% simulated geothermal brine at a temperature of 300° C. At various intervals, the autoclaving was briefly stopped and the samples were analyzed by visual inspection and manual stretching, and by TGA. Spectroscopic analysis was not regarded as useful, due to discoloration of the samples.

The TGA was performed using a DuPont 951 TGA unit in the dynamic mode. The samples were heated from room temperature to 650° C. at a rate of 10° C./min in a 90 cc/min nitrogen gas flow. Results are indicated in Table 8.

The results of the visual and manual inspection are indicated in Table 9.

TABLE 5
TENSILE TESTING OF CROSSLINKED, PERFLUORINATED POLYMERS

| Starting Polymer | Radiation | Fluorine Added (Weight %) | Elongation at Break, % | Tensile Strength at Break, lb/in$^2$ |
|---|---|---|---|---|
| Alas 150 (sl) | 15 | 0 | 325 | 500 |
| 150 (sl) | 30 | 39 | 225 | 200 |
| 150 (dl) | 80 | 247 | 20 | 1100 |
| Viton A-HV (sl) | 15 | 0 | 322 | 125 |
| (dl) | 15 | 4.1 | 99 | 133 |
| (sl) | 15 | 4.1 | 101 | 166 |
| (dl) | 30 | 0.0 | 83.2 | 104 |
| (dl) | 30 | 8.9 | 119.4 | 165 |
| (sl) | 60 | 0.0 | 50.6 | 87.8 |
| (dl) | 60 | 5.3 | 145.0 | 251 |

TABLE 6
SOLVENT SWELLING OF CROSSLINKED, PERFLUORINATED POLYMERS

| Starting Polymer | Radiation (Mrad) | Fluorination hrs. of 100% | Fluorine Added (Weight %) | Swelling Solvent | Weight Gain, % (Max; equil.) | Time to Reach Max. Weight |
|---|---|---|---|---|---|---|
| Aflas 150 | 15 | None Curing: 150° C., 44 hrs. | 0 | Ethyl Acetate | 50.3 | 10 min. |
| Aflas 150 | 20 | 82.5 hrs. | 31.4 | Freon 113 | 45% | 35 min. |
| Viton C-10 | 40 | 240 hrs. | 10.37 | Freon 113 | 40% | 80 hrs. |
| Viton AHV | 60 | None | 0 | Ethyl Acetate | 85.6% | 1 min. |
| Viton GH | 20 | None | 0 | Ethyl Acetate | 197% | N/N |

The perfluorinated elastomers that were prepared as described in Example 2 and 4 were analyzed by:

1. weight analysis. Increases in the weight of a sample represent the substitution of fluroine (molecular weight 18.998) for hydrogen (molecular weight 1.008). This assumes that no carbon atoms are lost from the elastomer, which is reasonable if the fluorination temperatures do not substantially exceed 100° C.

2. tensile testing, using the procedures described in Example 3. Results of these tests are indicated in Table 5.

3. swelling tests, using the procedures described in Example 3 with Freon 113 as the swelling solvent. Results of these tests are indicated in Table 6.

TABLE 7
THERMOGRAVIMETRIC ANALYSIS OF CROSSLINKED, PERFLUORINATED POLYMERS

| Starting Polymers | Radiation (Mrad) | Fluorination Curing (°C., hrs) | Fluorine Added (Weight %) | Temp., °C. at 50% Wt. Loss |
|---|---|---|---|---|
| Aflas 150 | 0.0 | None | 0.0 | 426 |
| Aflas 150 | 15 | None | 0.0 | 421 |
| 150 | 30 | N/A | 39.0 | 385 |
| 150 | 80 | N/A | 24.7 | 396 |
| Aflas 100 | 80 | N/A | 40.0 Est. | 384 |
| Viton AHV (sl) | 15 | None | 0.0 | 406 |
| Viton AHV (dl) | 15 | N/A | 4.1 | 408 |
| (sl) | 30 | None | 0.0 | 402 |

TABLE 8

THERMOGRAVIMETRIC ANALYSIS OF CROSSLINKED, PERFLUORINATED POLYMERS AFTER AUTOCLAVING

| Starting Polymers | Radiation (Mrad) | Fluorination (°C., psi, hrs. of 100% F) | Fluorine Added (Weight %) | Weight Loss % | 0 | 5 | 7 | 14 | 28 | 42 | 56 | 70 | 82 | 96 | 138 |
|---|---|---|---|---|---|---|---|---|---|---|---|---|---|---|---|
| Aflas 150 | 60 | 15, 25, 24 | N/A | 1 | 200 | 335 | | 400 | 325 | 350 | 350 | | 365 | 325 | 270 |
| | | | | 3 | 340 | 403 | | 435 | 415 | 415 | 415 | | 420 | 380 | 367 |
| Aflas 150 | 60 | 22, 30, 30 | 5.9% | 1 | 300 | | 400 | 390 | | | | 360 | | | |
| | | | | 3 | 400 | | 430 | 430 | | | | 410 | | | |
| 150 | 60 | N/A | N/A | 1 | 340 | | | | | | | | | | |
| | | | | 3 | 385 | | | | | | | | | | |
| | | | | 50 | 481 | | | | | | | | | | |
| 150 | 30 | N/A | N/A | 1 | 340 | | | | | | | | | | |
| | | | | 3 | 380 | | | | | | | | | | |
| | | | | 50 | 473 | | | | | | | | | | |
| 150 | 15 | N/A | N/A | 1 | 375 | | | | | | | | | | |
| | | | | 3 | 410 | | | | | | | | | | |
| | | | | 50 | 481 | | | | | | | | | | |
| Aflas 100 | 60 | N/A | N/A | 1 | 290 | | | 415 | 370 | 385 | 385 | | 370 | 370 | 290 |
| | | | | 3 | 345 | | | 440 | 435 | 435 | 445 | | 430 | 425 | 405 |
| Aflas 100 | 60 | 22, 30, 30 | 8.9% | 1 | 275 | | | 405 | 395 | | | 352 | | | |
| | | N/A | | 3 | 365 | | | 440 | 437 | | | 404 | | | |
| Aflas 100 | 0 | None | 0 | 1 | 405 | | | | | | | | | | |
| | | | | 3 | 420 | | | | | | | | | | |
| | | | | 50 | 484 | | | | | | | | | | |
| Viton C-10 | 0 | None | 0 | 1 | 315 | | | | | | | | | | |
| | | | | 3 | 420 | | | | | | | | | | |
| | | | | 50 | 484 | | | | | | | | | | |
| Viton A-35 | 0 | None | 0 | 1 | 380 | | | | | | | | | | |
| | | | | 3 | 420 | | | | | | | | | | |
| | | | | 50 | 473 | | | | | | | | | | |
| A A-35 | 30 | None | 0 | 1 | 270 | | | | | | | | | | |
| | | | | 3 | 305 | | | | | | | | | | |
| | | | | 50 | 461 | | | | | | | | | | |
| Viton A | 0 | None | 0 | 1 | 400 | | | | | | | | | | |
| | | | | 3 | 420 | | | | | | | | | | |
| | | | | 50 | 474 | | | | | | | | | | |
| A | 5 Mrad | None | 0 | 1 | 310 | | | | | | | | | | |
| | | | | 3 | 395 | | | | | | | | | | |
| | | | | 50 | 471 | | | | | | | | | | |
| Viton A | 10 | None | 0 | 1 | 315 | | | | | | | | | | |
| | | | | 3 | 385 | | | | | | | | | | |
| | | | | 50 | 372 | | | | | | | | | | |
| A | 20 | None | 0 | 1 | 325 | | | | | | | | | | |
| | | | | 3 | 365 | | | | | | | | | | |
| | | | | 50 | 460 | | | | | | | | | | |
| A | 30 | None | 0 | 1 | 315 | | | | | | | | | | |
| | | | | 3 | 370 | | | | | | | | | | |
| | | | | 50 | 460 | | | | | | | | | | |
| Viton A-HV | 15 | 25, 50, 52 | 5.0% | 1 | 185 | | | 395 | 380 | 375 | | | 100 | | |
| | | | | 3 | 380 | | | 440 | 425 | 440 | | | 375 | | |
| Nordel 1070 | 0 | None | 0 | 1 | 230 | | | | | | | | | | |
| | | | | 3 | 350 | | | | | | | | | | |
| | | | | 50 | 450 | | | | | | | | | | |
| Nordel 1470 | 0 | None | 0 | 1 | 210 | | | | | | | | | | |
| | | | | 3 | 320 | | | | | | | | | | |
| | | | | 50 | 436 | | | | | | | | | | |

TABLE 9

VISUAL/MANUAL INSPECTION OF CROSSLINKED, PERFLUORINATED POLYMERS AFTER AUTOCLAVING

| Starting Polymers | Radiation (Mrad) | Fluorination Parameters (°C. psi, hrs. of 100% F) | Fluorine Added (Weight %) | Comments, Observations |
|---|---|---|---|---|
| Aflas 150 | 30 | N/A | N/A | deteriorated beyond recognition after 1st exposure |
| Aflas 150 | 60 | N/A | N/A | remained together after 138 days but can easily be pulled apart |
| Aflas 150 | 60 | 22, 30, 30 | 5.9% | still very pliable with most of the elasticity left after 56 days-will be further tested |
| Aflas 100 | 30 | 25, 50, 52 | N/A | deteriorated beyond recognition after 1st exposure |
| Aflas 100 | 60 | 12, 35, 22 | N/A | remained together after 138 days but can easily be pulled apart |
| Aflas 100 | 60 | 22, 30, 30 | 8.9% | still very pliable with most of the elasticity left after 56 days will be further tested |
| Viton C-10 | 10 | N/A | N/A | deteriorated beyond recognition after 1st exposure |
| Viton A-35 | 15 | 36, 25, 48 | N/A | deteriorated beyond recogntion after 1st exposure |
| Viton A-HV | 15 | 36, 25, 48 | N/A | deteriorated after 70 autoclaving, progressively darker in color |
| Viton A-HV | 15 | 25, 50, 52 | 5.0% | deteriorated beyond recognition after 1st exposure |
| Viton A-HV | 60 | 25, 50, 52 | N/A | deteriorated beyond recognition after 1st exposure |

TABLE 9-continued
VISUAL/MANUAL INSPECTION OF CROSSLINKED, PERFLUORINATED POLYMERS AFTER AUTOCLAVING

| Starting Polymers | Radiation (Mrad) | Fluorination Parameters (°C. psi, hrs. of 100% F) | Fluorine Added (Weight %) | Comments, Observations |
|---|---|---|---|---|
| Viton A-HV | 60 | 22, 30, 30 | N/A | deteriorated beyond recognition after 1st exposure |

Note: All samples became progessively darker in color after each period of autoclaving.

References

1. See, e.g., *Introduction to Polymer Science and Technology*, H. S. Kaufman, Ed. (Wiley, New York City, 1977).
2. See, e.g., *Fluorine Chemistry*, J. H. Simmons, Ed. (Academic Press, New York City, 1970).
3. See, e.g., U.S. Pat Nos. 3,718,558 (Tabata et al, 1973) and 3,846,267 (Tabata et al, 1974).
4. See, e.g., R. J. Lagow et al, "Direct Fluorination: A 'New' Approach to Fluorine Chemistry," *Progress in Inorganic Chemistry* Vol. 26, S. J. Lippard, Ed. (Wiley, New York City, 1979); U.S. Pat. No. 4,076,916 (Lagow, 1978); U.S. Pat. No. 4,113,435 (Lagow et al, 1978); U.S. Pat. No. 4,144,374 (Lagow et al, 1979); U.S. Pat. No. 4,281,119 (Lagow et al, 1981).
5. See, e.g., the patents cited in footnote 4.

We claim:

1. A perfluorinated crosslinked polymer wherein the polymer backbone chains have attached thereto a sufficient number of organic groups to prevent crystallization, and wherein the crosslinking occurs between backbone chain carbon atoms produced by a method comprising the steps of:
   a. providing a tetrafluoroethylene-propylene polymer having a fluorine content of about 10 to about 65 mole percent and a molecular weight of about 10,000 to about 10,000,000 daltons;
   b. exposing the polymer to electron radiation having an energy level of about 1 Mev, at a dosage of about 1 Mrad/minute thereby crosslinking the polymer by creating crosslinks between carbon atoms of the backbone chains; and
   c. perfluorinating the crosslinked polymer by:
      (i) placing the polymer obtained in step (b) in a fluorine reactor having means for the introduction of a gas;
      (ii) establishing a flow of inert gas into the reactor to provide an inert gas atmosphere;
      (iii) introducing a flow of fluorine gas into the reactor to yield a mixture of fluorine gas and inert gas containing about 0.2% fluorine; and
      (iv) gradually increasing the proportion of fluorine gas in the mixture until an atmosphere of essentially pure fluorine gas is established under conditions sufficient to perfluorinate the polymer.

2. A perfluorinated elastomer of claim 1, containing a filler.

3. A perfluorinated elastomer of claim 2, wherein the filler is selected from the group consisting of carbon black, fluorinated carbon black, graphite, fluorinated graphite, polytetrafluoroethylene or inorganic fluorides.

4. A perfluorinated elastomer of claim 1, containing a plasticizer.

5. A perfluorinated elastomer of claim 4, wherein the plasticizer comprises a halogenated organic substance.

6. A perfluorinate crosslinked polymer, wherein the polymer backbone chains have attached thereto a sufficient number of organic groups to prevent crystallization, and wherein the crosslinking occurs between backbone chain carbon atoms produced by a method comprising the steps of:
   a. providing a vinlyidene-hexafluoroproplylene polymer having a fluorine content of about 10 to about 65 mole percent and molecular weight of about 10,000 to about 10,000,000 daltons;
   b. exposing the polymer to electron radiation having an energy level of about 1 Mev, at a dosage of about 1 Mrad (minute thereby crosslinking the polymer by creating crosslinks between carbon atoms of the backbone chains; and
   c. perfluorinating the crosslinked polymer by:
      (i) placing the polymer obtained in step (b) in a fluorine reactor having means for the introduction of a gas;
      (ii) establishing a flow of inert gas into the reactor to provide an inert gas atmosphere;
      (iii) introducing a flow of fluorine gas into the reactor to yield a mixture of fluorine gas and inert gas containing about 0.2% fluorine; and
      (iv) gradually increasing the proportion of fluorine gas in the mixture until an atmosphere of essentially pure fluorine gas is established under conditions sufficient to perfluorinate the polymer.

7. A perfluorinated elastomer of claim 6, containing a filler.

8. A perfluorinated elastomer of claim 7, wherein the filler is selected from the group consisting of carbon black, fluorinated carbon black, graphite, fluorinated graphite, polytetrafluoroethylene or inorganic fluorides.

9. A perfluorinated elastomer of claim 6, containing plasticizer.

10. A perfluorinated elastomer of claim 9, wherein the plasticizer comprises a halogenated organic substance.

* * * * *